(12) United States Patent
Chen et al.

(10) Patent No.: US 8,536,290 B2
(45) Date of Patent: Sep. 17, 2013

(54) PROCATALYST COMPOSITION WITH ALKOXYALKYL 2-PROPENOATE INTERNAL ELECTRON DONOR AND POLYMER FROM SAME

(75) Inventors: Linfeng Chen, Missouri City, TX (US); Tak W. Leung, Houston, TX (US); Tao Tao, Houston, TX (US)

(73) Assignee: Dow Global Technologies LLC, Midland, MI (US)

(*) Notice: Subject to any disclaimer, the term of this patent is extended or adjusted under 35 U.S.C. 154(b) by 223 days.

(21) Appl. No.: 12/974,667

(22) Filed: Dec. 21, 2010

(65) Prior Publication Data

US 2012/0157643 A1  Jun. 21, 2012

(51) Int. Cl.
*B01J 31/14* (2006.01)
*C08F 2/00* (2006.01)

(52) U.S. Cl.
USPC .......................................... 526/209; 502/126

(58) Field of Classification Search
None
See application file for complete search history.

(56) References Cited

U.S. PATENT DOCUMENTS

| | | | |
|---|---|---|---|
| 4,563,436 A | 1/1986 | Yokoyama et al. | |
| 5,459,116 A | 10/1995 | Ro et al. | |

FOREIGN PATENT DOCUMENTS

| | | | |
|---|---|---|---|
| CN | 101914172 A | * | 12/2010 |
| EP | 0849287 A1 | | 6/1998 |
| JP | 06104688 | | 12/1986 |
| JP | 06104689 | | 12/1986 |
| JP | 06104690 | | 12/1986 |
| JP | 06104691 | | 12/1986 |
| JP | 07017704 | | 1/1987 |
| JP | 63291907 | | 11/1988 |
| WO | 0238619 A1 | | 5/2002 |

* cited by examiner

Primary Examiner — Melvin C Mayes
Assistant Examiner — Yun Qian
(74) Attorney, Agent, or Firm — Whyte Hirschboeck Dudek S.C.

(57) ABSTRACT

Disclosed herein are catalyst compositions and polymers, i.e., propylene-based polymers, produced therefrom. The present catalyst compositions contain an internal electron donor of an alkoxyalkyl 2-propenoate and optionally a mixed external electron donor. The present catalyst compositions improve catalyst selectivity and polymer stiffness. Polypropylene homopolymer produced from the present catalyst composition has a xylene solubles content less than 4 wt % and a $T_{MF}$ greater than 172.0° C.

8 Claims, No Drawings

PROCATALYST COMPOSITION WITH ALKOXYALKYL 2-PROPENOATE INTERNAL ELECTRON DONOR AND POLYMER FROM SAME

BACKGROUND

The present disclosure provides a process for enhancing procatalyst and catalyst properties. The present disclosure provides formant polymers produced by these procatalysts/catalysts.

Worldwide demand for olefin-based polymers continues to grow as applications for these polymers become more diverse and more sophisticated. Known are Ziegler-Natta catalyst compositions for the production of olefin-based polymers and propylene-based polymers in particular. Ziegler-Natta catalyst compositions typically include a procatalyst containing a transition metal halide (i.e., titanium, chromium, vanadium), a cocatalyst such as an organoaluminum compound, and optionally an external electron donor. Many conventional Ziegler-Natta catalyst compositions include a magnesium chloride-supported titanium chloride procatalyst with a phthalate-based internal electron donor.

The health concerns from phthalate exposure are driving the art to find phthalate substitutes. Known are catalyst compositions containing an alkoxyalkyl ester (AE) as an internal electron donor for the production of propylene-based polymers. However, conventional AE-containing catalysts are currently not viable because their catalyst activity and/or selectivity are too low for commercial application. Desirable would be Ziegler-Natta procatalyst compositions containing an alkoxyalkyl ester internal electron donor with sufficient catalyst activity/selectivity for the commercial (i.e., large-scale) production of olefin-based polymers.

SUMMARY

The present disclosure provides a process for producing a Ziegler-Natta procatalyst composition containing an alkoxyalkyl 2-propenoate as an internal electron donor. The Applicant has discovered that alkoxyalkyl 2-propenoate (and compounded alkoxyalkyl 2-propenoate in particular) surprisingly improves catalyst selectivity compared to conventional AE-containing catalysts. In addition to improved catalyst selectivity, the present procatalyst composition produces polypropylene homopolymer with low xylene solubles and high $T_{MF}$.

The present disclosure provides a composition. In an embodiment, a procatalyst composition is provided and includes a combination of a magnesium moiety, a titanium moiety, and an internal electron donor. The internal electron donor includes an alkoxyalkyl 2-propenoate.

The alkoxyalkyl 2-propenoate has the structure (I) below.

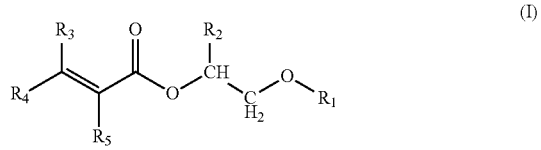

$R_1$-$R_5$ are the same or different. $R_1$ is selected from a $C_1$-$C_{20}$ primary alkyl group, a substituted $C_1$-$C_{20}$ primary alkyl group, and a $C_2$-$C_{20}$ alkenyl group. $R_2$ is selected from hydrogen, a $C_1$-$C_{20}$ primary alkyl group, a substituted $C_1$-$C_{20}$ primary alkyl group, and a $C_2$-$C_{20}$ alkenyl group. Each of $R_3$, $R_4$, $R_5$ is selected from hydrogen, halogen, a $C_1$-$C_{20}$ hydrocarbyl group, and a substituted $C_1$-$C_{20}$ hydrocarbyl group.

The disclosure provides another composition. In an embodiment, a catalyst composition is provided and includes a procatalyst composition, a cocatalyst, and an external electron donor. The procatalyst composition includes a combination of a magnesium moiety, a titanium moiety, and an internal electron donor. The internal electron donor contains an alkoxyalkyl 2-propenoate.

The disclosure provides a process. In an embodiment, a polymerization process is provided and includes contacting, under polymerization conditions, propylene and optionally one or more comonomers with a catalyst composition. The catalyst composition is composed of a procatalyst composition, a cocatalyst, and an external electron donor. The internal electron donor contains an alkoxyalkyl 2-propenoate. The process further includes forming a propylene-based polymer.

The disclosure provides another composition. In an embodiment, a polymeric composition is provided and includes a propylene-based polymer. The propylene-based composition contains an alkoxyalkyl 2-propenoate.

An advantage of the present disclosure is the provision of an improved procatalyst/catalyst composition.

An advantage of the present disclosure is the provision of a procatalyst/catalyst composition with improved selectivity for the polymerization of olefin-based polymers.

An advantage of the present disclosure is a phthalate-free procatalyst/catalyst composition.

An advantage of the present disclosure is the provision of a phthalate-free catalyst composition and a phthalate-free olefin-based polymer produced therefrom.

DETAILED DESCRIPTION

The present disclosure provides a procatalyst composition having an alkoxyalkyl 2-propenoate as an internal electron donor. The alkoxyalkyl 2-propenoate may be a compounded alkoxyalkyl 2-propenoate. The present catalyst composition improves catalyst selectivity and produces propylene-based polymer with a low xylene solubles content and high $T_{MF}$.

In an embodiment, a procatalyst composition is provided. The procatalyst composition includes a combination of a magnesium moiety, a titanium moiety, and an internal electron donor. The internal electron donor includes an alkoxyalkyl 2-propenoate.

Procatalyst Precursor

The procatalyst composition is formed by multiple contacts (two, three, or more) between a procatalyst precursor and a halogenating agent in the presence of an alkoxyalkyl 2-propenoate (internal electron donor). The procatalyst precursor contains magnesium and may be a magnesium moiety compound (MagMo), a mixed magnesium titanium compound (MagTi), or a benzoate-containing magnesium chloride compound (BenMag). In an embodiment, the procatalyst precursor is a magnesium moiety ("MagMo") precursor. The "MagMo precursor" contains magnesium as the sole metal component. The MagMo precursor includes a magnesium moiety. Nonlimiting examples of suitable magnesium moieties include anhydrous magnesium chloride and/or its alcohol adduct, magnesium alkoxide or aryloxide, mixed magnesium alkoxy halide, and/or carbonated magnesium dialkoxide or aryloxide. In one embodiment, the MagMo precursor is a magnesium di($C_{1-4}$)alkoxide. In a further embodiment, the MagMo precursor is diethoxymagnesium.

In an embodiment, the procatalyst precursor is a mixed magnesium/titanium compound ("MagTi"). The "MagTi precursor" has the formula $Mg_d Ti(OR^e)_f X_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine, preferably chlorine; d is 0.5 to 56, or 2 to 4; f is 2 to 116 or 5 to 15; and g is 0.5 to 116, or 1 to 3. The MagTi precursor is prepared by controlled precipitation through removal of an alcohol from the precursor reaction medium used in their preparation. In an embodiment, a reaction medium comprises a mixture of an aromatic liquid, such as a chlorinated aromatic compound, or chlorobenzene, with an alkanol, especially ethanol. Suitable halogenating agents include titanium tetrabromide, titanium tetrachloride or titanium trichloride, especially titanium tetrachloride. Removal of the alkanol from the solution used in the halogenation, results in precipitation of the solid precursor, having desirable morphology and surface area. In a further embodiment, the resulting procatalyst precursor is a plurality of particles that are essentially uniform in particle size.

In an embodiment, the procatalyst precursor is a benzoate-containing magnesium chloride material. As used herein, a "benzoate-containing magnesium chloride" ("BenMag") can be a procatalyst (i.e., a halogenated procatalyst precursor) containing a benzoate internal electron donor. The BenMag material may also include a titanium moiety, such as a titanium halide. The benzoate internal donor is labile and can be replaced by other electron donors during procatalyst and/or catalyst synthesis. Nonlimiting examples of suitable benzoate groups include ethyl benzoate, methyl benzoate, ethyl p-methoxybenzoate, methyl p-ethoxybenzoate, ethyl p-ethoxybenzoate, ethyl p-chlorobenzoate. In one embodiment, the benzoate group is ethyl benzoate. Nonlimiting examples of suitable BenMag procatalyst precursors include procatalysts of the trade names SHAC™ 103 and SHAC™ 310 available from The Dow Chemical Company, Midland, Mich. In an embodiment, the BenMag procatalyst precursor may be a product of halogenation of any procatalyst precursor (i.e., a MagMo precursor or a MagTi precursor) in the presence of a benzoate compound.

Procatalyst Composition

The procatalyst precursor is contacted two, three, or more times with a halogenating agent in the presence of an alkoxyalkyl 2-propenoate to form the procatalyst composition. The alkoxyalkyl 2-propenoate is an internal electron donor. As used herein, an "internal electron donor" (or "IED") is a compound added or otherwise formed during formation of the procatalyst composition that donates at least one pair of electrons to one or more metals present in the resultant procatalyst composition. Not wishing to be bound by any particular theory, it is believed that during halogenation (and titanation) the internal electron donor (1) regulates the formation of active sites and thereby enhances catalyst stereoselectivity, (2) regulates the position of titanium on the magnesium-based support, (3) facilitates conversion of the magnesium and titanium moieties into respective halides and (4) regulates the crystallite size of the magnesium halide support during conversion. Thus, provision of the internal electron donor yields a procatalyst composition with enhanced stereoselectivity. The internal electron donor is one, two, or more alkoxyalkyl 2-propenoate(s).

A "compounded alkoxyalkyl 2-propenoate" as used herein, is an alkoxyalkyl 2-propenoate complexed to a procatalyst component and formed by two or more contact steps during procatalyst synthesis. The compounded alkoxyalkyl 2-propenoate is present in the resultant procatalyst composition in an amount greater than 4.5 wt % (based on total weight of the procatalyst composition).

The term "contacting," or "contact," or "contact step" in the context of procatalyst synthesis, is the chemical reaction that occurs in a reaction mixture (optionally heated) containing a procatalyst precursor/intermediate, a halogenating agent (with optional titanating agent), an alkoxyalkyl 2-propenoate, and a solvent. The reaction product of a "contact step" is a procatalyst composition (or a procatalyst intermediate) that is a combination of a magnesium moiety, a titanium moiety, complexed with the alkoxyalkyl 2-propenoate (internal electron donor).

Halogenation (or halogenating) occurs by way of a halogenating agent. A "halogenating agent," as used herein, is a compound that converts the procatalyst precursor (or procatalyst intermediate) into a halide form. A "titanating agent," as used herein, is a compound that provides the catalytically active titanium species. Halogenation and titanation convert the magnesium moiety present in the procatalyst precursor into a magnesium halide support upon which the titanium moiety (such as a titanium halide) is deposited.

In an embodiment, the halogenating agent is a titanium halide having the formula $Ti(OR^e)_f X_h$ wherein $R^e$ and X are defined as above, f is an integer from 0 to 3; h is an integer from 1 to 4; and f+h is 4. In this way, the titanium halide is simultaneously the halogenating agent and the titanating agent. In a further embodiment, the titanium halide is $TiCl_4$ and halogenation occurs by way of chlorination of the procatalyst precursor with the $TiCl_4$. The chlorination (and titanation) is conducted in the presence of a chlorinated or a non-chlorinated aromatic or aliphatic liquid, such as dichlorobenzene, o-chlorotoluene, chlorobenzene, benzene, toluene, xylene, octane, or 1,1,2-trichloroethane. In yet another embodiment, the halogenation and the titanation are conducted by use of a mixture of halogenating agent and chlorinated aromatic liquid comprising from 40 to 60 volume percent halogenating agent, such as $TiCl_4$.

In an embodiment, the procatalyst composition is made by way of multiple contact steps in accordance with one or more processes set forth in copending U.S. patent application Ser. No. 12/974,548 filed on Dec. 21, 2010, the entire content of which is incorporated by reference herein. The procatalyst composition with compounded alkoxyalkyl 2-propenoate contains greater than 4.5 wt %, or greater than 5 wt %, or greater than 7 wt %, or greater than 10 wt % to 15 wt % alkoxyalkyl 2-propenoate. Weight percent is based on the total weight of the procatalyst composition.

Applicant has surprisingly discovered that the procatalyst composition with the compounded alkoxyalkyl 2-propenoate unexpectedly produces a procatalyst composition with improved selectivity and improved polymer melting point when compared to conventional alkoxyalkyl ester-containing procatalysts. Conventional alkoxyalkyl ester-containing procatalysts are single-addition alkoxyalkyl ester procatalysts and do not contain compounded alkoxyalkyl 2-propenoate. The present procatalyst composition, with the compounded alkoxyalkyl 2-propenoate (and greater than 4.5 wt % alkoxyalkyl 2-propenoate), advantageously contains more alkoxyalkyl ester (i.e. 2-propenoate) than conventional alkoxyalkyl ester-containing procatalysts. The present procatalyst composition is phthalate-free yet exhibits the same, or improved, selectivity and polymer melting point when compared to phthalate-containing procatalyst compositions.

The advantages and improvements of the present procatalyst composition are unexpected. The presence of the alkenyl functional group significantly enhances catalyst selectivity compared to the saturated AE analog. In addition, it is very difficult, if not impossible, to predict whether a compounded alkoxyalkyl ester will improve the overall performance of the resultant procatalyst composition. For example, Applicant observes that for some heavily substituted alkoxyalkyl ester compounds, such as 1-methoxypropan-1-phenylethyl benzoate and 1-methoxy-2-methylpropan-2-yl benzoate, multiple internal donor additions slightly increase internal electron donor content in the procatalyst, but do not improve catalyst selectivity. Bounded by no particular theory, this may be due to the insufficient binding strength between the internal electron donor and procatalyst. Other examples include 3-methoxypropyl pivalate, which exhibits much higher internal electron donor content in the procatalyst upon multiple internal electron donor additions, but has lower selectivity.

In an embodiment, the alkoxyalkyl 2-propenoate has the structure (I) set forth below.

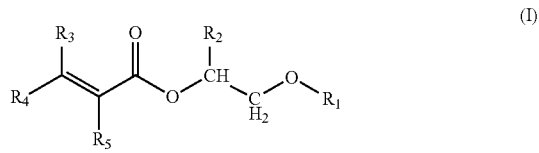

(I)

$R_1$-$R_5$ are the same or different. Each of $R_1$-$R_2$ is selected from hydrogen (except $R_1$ is not hydrogen), a $C_1$-$C_{20}$ hydrocarbyl group, a substituted $C_1$-$C_{20}$ hydrocarbyl group, and a substituted/unsubstituted $C_2$-$C_{20}$ alkenyl group. $R_3$, $R_4$, $R_5$ of structure (I) are the same or different. Each of $R_3$, $R_4$, and $R_5$ is selected from hydrogen, halogen, a $C_1$-$C_{20}$ hydrocarbyl group, a substituted $C_1$-$C_{20}$ hydrocarbyl group, and any combination thereof.

In an embodiment, each of $R_1$ and $R_2$ is selected from a substituted/unsubstituted $C_1$-$C_{20}$ primary alkyl group or from a substituted/unsubstituted alkenyl group with the structure (II) below.

C(H)=C($R_{11}$)($R_{12}$)  (II)

$R_{11}$ and $R_{12}$ are the same or different. Each of $R_{11}$ and $R_{12}$ is selected from hydrogen and a $C_1$-$C_{18}$ hydrocarbyl group.

As used herein, the term "hydrocarbyl" or "hydrocarbon" is a substituent containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, alkylaryl-, and alkynyl-groups.

As used herein, the term "substituted hydrocarbyl" or "substituted hydrocarbon" is a hydrocarbyl group that is substituted with one or more nonhydrocarbyl substituent groups. A nonlimiting example of a nonhydrocarbyl substituent group is a heteroatom. As used herein, a "heteroatom" is an atom other than carbon or hydrogen. The heteroatom can be a non-carbon atom from Groups IV, V, VI, and VII of the Periodic Table. Nonlimiting examples of heteroatoms include: halogens (F Cl, Br, I), N, O, P, B, S, and Si. A substituted hydrocarbyl group also includes a halohydrocarbyl group and a silicon-containing hydrocarbyl group. As used herein, the term "halohydrocarbyl" group is a hydrocarbyl group that is substituted with one or more halogen atoms.

The alkoxyalkyl 2-propenoate can be any alkoxyalkyl 2-propenoate as set forth in Table 1. In an embodiment, the alkoxyalkyl 2-propenoate is 2-methoxyethyl methacrylate.

In an embodiment, the alkoxyalkyl 2-propenoate is 2-ethoxyethyl methacrylate.

In an embodiment, the magnesium moiety is a magnesium chloride. The titanium moiety is a titanium chloride.

The resulting procatalyst composition has a titanium content from about 1.0 wt %, or about 1.5 wt %, or about 2.0 wt %, to about 6.0 wt %, or about 5.5 wt %, or about 5.0 wt %. The weight ratio of titanium to magnesium in the solid procatalyst composition is suitably between about 1:3 and about 1:160, or between about 1:4 and about 1:50, or between about 1:6 and 1:30. The compounded alkoxyalkyl 2-propenoate may be present in the procatalyst composition in a molar ratio of compounded alkoxyalkyl 2-propenoate to magnesium of from about 0.005:1 to about 1:1, or from about 0.01:1 to about 0.4:1. Weight percent is based on the total weight of the procatalyst composition.

In an embodiment, the procatalyst composition contains from 0.1 wt %, or greater than 0.1 wt % to 6 wt % decomposition products, including ethyl ester of the carboxylic acid fragment in the internal donor molecule.

The procatalyst composition may comprise two or more embodiments disclosed herein.

Catalyst Composition

The present disclosure provides a catalyst composition. In an embodiment, the catalyst composition includes a procatalyst composition containing the alkoxyalkyl 2-propenoate (or compounded alkoxy 2-propenoate), a cocatalyst, and an external electron donor. The procatalyst composition may be any of the foregoing procatalyst compositions containing structures (I)-(II) as disclosed above.

In an embodiment, the alkoxyalkyl 2-propenoate is a compounded alkoxyalkyl 2-propenoate.

As used herein, a "cocatalyst" is a substance capable of converting the procatalyst to an active polymerization catalyst. The cocatalyst may include hydrides, alkyls, or aryls of aluminum, lithium, zinc, tin, cadmium, beryllium, magnesium, and combinations thereof. In an embodiment, the cocatalyst is a hydrocarbyl aluminum compound represented by the formula $RnAlX_{3-n}$ wherein n=1, 2, or 3, R is an alkyl, and X is a halide or alkoxide. In an embodiment, the cocatalyst is selected from trimethylaluminum, triethylaluminum, triisobutylaluminum, and tri-n-hexylaluminum.

Nonlimiting examples of suitable hydrocarbyl aluminum compounds are as follows: methylaluminoxane, isobutylaluminoxane, diethylaluminum ethoxide, diisobutylaluminum chloride, tetraethyldialuminoxane, tetraisobutyldialuminoxane, diethylaluminum chloride, ethylaluminum dichloride, methylaluminum dichloride, dimethylaluminum chloride, triisobutylaluminum, tri-n-hexylaluminum, diisobutylaluminum hydride, di-n-hexylaluminum hydride, isobutylaluminum dihydride, n-hexylaluminum dihydride, diisobutylhexylaluminum, isobutyldihexylaluminum, trimethylaluminum, triethylaluminum, tri-n-propylaluminum, triisopropylaluminum, tri-n-butylaluminum, tri-n-octylaluminum, tri-n-decylaluminum, tri-n-dodecylaluminum, diisobutylaluminum hydride, and di-n-hexylaluminum hydride.

In an embodiment, the cocatalyst is triethylaluminum. The molar ratio of aluminum to titanium is from about 5:1 to about 500:1, or from about 10:1 to about 200:1, or from about 15:1 to about 150:1, or from about 20:1 to about 100:1. In another embodiment, the molar ratio of aluminum to titanium is about 45:1.

As used herein, an "external electron donor" (or "EED") is a compound added independent of procatalyst formation and includes at least one functional group that is capable of donating a pair of electrons to a metal atom. Bounded by no particular theory, it is believed that provision of one or more external electron donors in the catalyst composition affects the following properties of the formant polymer: level of tacticity (i.e., xylene soluble material), molecular weight (i.e., melt flow), molecular weight distribution (MWD), and/or melting point.

In an embodiment, the EED is a silicon compound having the general formula (III):

$$SiR_m(OR')_{4-m} \quad (III)$$

wherein R independently each occurrence is hydrogen or a hydrocarbyl or an amino group, optionally substituted with one or more substituents containing one or more Group 14, 15, 16, or 17 heteroatoms. R contains up to 20 atoms not counting hydrogen and halogen. R' is a $C_{1-20}$ alkyl group, and m is 0, 1, 2, or 3. In an embodiment, R is $C_{1-20}$ linear alkyl, $C_{6-12}$ aryl, aralkyl or alkylaryl, $C_{3-12}$ cycloalkyl, $C_{3-12}$ branched alkyl, or $C_{2-12}$ cyclic amino group, R' is $C_{1-4}$ alkyl, and m is 0, 1, or 2.

In an embodiment, the silicon compound is dicyclopentyldimethoxysilane (DCPDMS), methylcyclohexyldimethoxysilane (MChDMS), or n-propyltrimethoxysilane (NPTMS), and any combination thereof. In an embodiment, the silicon compound is diisopropyldimethoxysilane, isopropylisobutyldimethoxysilane, diisobutyldimethoxysilane, t-butylisopropyldimethoxysilane, cyclopentylpyrrolidinodimethoxysilane, bis(pyrrolidino)dimethoxysilane, bis(perhydroisoquinolino)dimethoxysilane, diethylaminotriethoxysilane, and any combination thereof.

Mixed External Electron Donor

In an embodiment, the present catalyst composition includes a mixed external electron donor (M-EED). As used herein, a "mixed external electron donor" ("M-EED") comprises at least two of the following components: (i) a first selectivity control agent (SCA1), (ii) optionally a second selectivity control agent (SCA2), and (iii) an activity limiting agent (ALA).

Nonlimiting examples of suitable compounds for the SCA1 and/or SCA2 include silicon compounds, such as alkoxysilanes; ethers and polyethers, such as alkyl-, cycloalkyl-, aryl-, mixed alkyl/aryl-, mixed alkyl/cycloalkyl-, and/or mixed cycloalkyl/aryl-ethers and/or polyethers; esters and polyesters, especially alkyl, cycloalkyl- and/or aryl-esters of monocarboxylic or dicarboxylic acids, such as aromatic monocarboxylic- or dicarboxylic-acids; alkyl- or cycloalkyl-ether or thioether derivatives of such esters or polyesters, such as alkyl ether derivatives of alkyl esters or diesters of aromatic monocarboxylic or dicarboxylic acids; and Group 15 or 16 heteroatom-substituted derivatives of all of the foregoing; and amine compounds, such as cyclic, aliphatic or aromatic amines, more especially piperidine, pyrrol or pyridine compounds; all of the foregoing SCA's containing from 2 to 60 carbons total and from 1 to 20 carbons in any alkyl or alkylene group, 3 to 20 carbons in any cycloalkyl or cycloalkylene group, and 6 to 20 carbons in any aryl or arylene group.

In an embodiment, SCA1 and/or SCA2 are/is a silane composition having the structure (III) as disclosed above.

In an embodiment, SCA1 is a dimethoxysilane. The dimethoxysilane may include a dimethoxysilane having at least one secondary alkyl and/or a secondary amino group directly bonded to the silicon atom. Nonlimiting examples of suitable dimethoxysilanes include dicyclopentyldimethoxysilane, methylcyclohexyldimethoxysilane, diisopropyldimethoxysilane, isopropylisobutyldimethoxysilane, diisobutyldimethoxysilane, t-butylisopropyldimethoxysilane, cyclopentylpyrrolidinodimethoxysilane, bis(pyrrolidino)dimethoxysilane, bis(perhydroisoquinolino)dimethoxysilane, and any combination of the foregoing. In a further embodiment, SCA1 is dicyclopentyldimethoxysilane.

In an embodiment, the SCA2 is a silicon compound selected from a diethoxysilane, a triethoxysilane, a tetraethoxysilane, a trimethoxysilane, a dimethoxysilane containing two linear alkyl groups, a dimethoxysilane containing two alkenyl groups, a diether, a dialkoxybenzene, and any combination thereof.

Nonlimiting examples of suitable silicon compounds for SCA2 include dimethyldimethoxysilane, vinylmethyldimethoxysilane, n-octylmethyldimethoxysilane, n-octadecylmethyldimethoxysilane, methyldimethoxysilane, 3-chloropropylmethyldimethoxysilane, 2-chloroethylmethyldimethoxysilane, allyldimethoxysilane, (3,3,3-trifluoropropyl)methyldimethoxysilane, n-propylmethyldimethoxysilane, chloromethylmethyldimethoxysilane, di-n-octyldimethoxysilane, vinyl(chloromethyl)dimethoxysilane, methylcyclohexyldiethoxysilane, vinylmethyldiethoxysilane, 1-(triethoxysilyl)-2-(diethoxymethylsilyl)ethane, n-octylmethyldiethoxysilane, octaethoxy-1,3,5-trisilapentane, n-octadecylmethyldiethoxysilane, methacryloxypropylmethyldiethoxysilane, 2-hydroxy-4-(3-methyldiethoxysilylpropoxy)diphenylketone, (3-glycidoxypropyl)methyldiethoxysilane, dodecylmethyldiethoxysilane, dimethyldiethoxysilane, diethyldiethoxysilane, 1,1-diethoxy-1-silacyclopent-3-ene, chloromethylmethyldiethoxysilane, bis(methyldiethoxysilylpropyl)amine, 3-aminopropylmethyldiethoxysilane, (methacryloxymethyl)methyldiethoxysilane, 1,2-bis(methyldiethoxysilyl)ethane, and diisobutyldiethoxysilane, vinyltrimethoxysilane, vinyltriethoxysilane, benzyltriethoxysilane, butenyltriethoxysilane, (triethoxysilyl)cyclohexane, O-(vinyloxybutyl)-N-triethoxysilylpropylcarbamate, 10-undecenyltrimethoxysilane, n-(3-trimethoxysilylpropyl)pyrrole, N-[5-(trimethoxysilyl)-2-aza-1-oxopentyl]caprolactam, (3,3,3-trifluoropropyl)trimethoxysilane, triethoxysilylundecanal ethylene glycol acetal, (S)—N-triethoxysilylpropyl-O-menthocarbamate, triethoxysilylpropylethylcarbamate, N-(3-triethoxysilylpropyl)-4,5-dihydroimidazole, (3-triethoxysilylpropyl)-t-butylcarbamate, styrylethyltrimethoxysilane, 2-(4-pyridylethyl)triethoxysilane, n-propyltrimethoxysilane, n-propyltriethoxysilane, (S)—N-1-phenylethyl-N'-triethoxysilylpropylurea, (R)—N-1-phenylethyl-N'-triethoxysilylpropylurea, N-phenylaminopropyltrimethoxysilane, N-phenylaminomethyltriethoxysilane, phenethyltrimethoxysilane, pentyltriethoxysilane, n-octyltrimethoxysilane, n-octyltriethoxysilane, 7-octenyltrimethoxysilane, S-(octanoyl)mercaptopropyltriethoxysilane, n-octadecyltrimethoxysilane, n-octadecyltriethoxysilane, methyltrimethoxysilane, methyltriethoxysilane, N-methylaminopropyltrimethoxysilane, 3-methoxypropyltrimethoxysilane, methacryloxypropyltrimethoxysilane, methacryloxypropyltriethoxysilane, methacryloxymethyltrimethoxysilane, methacryloxymethyltriethoxysilane, and O-(methacryloxyethyl)-N-(triethoxysilylpropyl)carbamate, tetramethoxysilane and/or tetraethoxysilane.

In an embodiment, SCA2 may be methylcyclohexyldiethoxysilane, di-isobutyldiethoxysilane, n-propyltriethoxysilane, tetraethoxysilane, di-n-butyl-dimethoxysilane, benzyltriethoxysilane, but-3-enyltriethoxysilane, 1-(triethoxysilyl)-2-pentene, (triethoxysilyl)cyclohexane, and any combination of the foregoing.

In an embodiment, the SCA2 is selected from a dimethoxysilane containing two linear alkyl groups, a dimethoxysilane containing two alkenyl groups or hydrogen, wherein one or more hydrogen atoms may be substituted by a halogen, and any combination thereof.

In an embodiment, SCA2 may be a diether, a dimer of a diether, a dialkoxybenzene, a dimmer of a dialkoxybenzene, a dialkoxybenzene linked by a linear hydrocarbon group, and any combination thereof. It is noted that the diethers for the ALA set forth below apply equally as nonlimiting examples for the SCA2 diether.

The M-EED may include an activity limiting agent (ALA). An "activity limiting agent," as used herein is a material that reduces catalyst activity at elevated temperature, namely, in a polymerization reactor at polymerization conditions at a temperature greater than about 100° C. Provision of the ALA results in a self-limiting catalyst composition. As used herein, a "self-limiting" catalyst composition is a catalyst composition that demonstrates decreased activity at a temperature greater than about 100° C. In other words, "self-limiting" is the significant decline of catalyst activity when the reaction temperature rises above 100° C. compared to the catalyst activity under normal polymerization conditions with reaction temperature usually below 80° C. In addition, as a practical standard, if a polymerization process, such as a fluidized bed, gas-phase polymerization running at normal processing conditions is capable of interruption and resulting collapse of the bed with reduced risk with respect to agglomeration of polymer particles, the catalyst composition is said to be "self-limiting."

The ALA may be an aromatic ester or a derivative thereof, an aliphatic ester or derivative thereof, a diether, a poly(alkylene glycol) ester, and combinations thereof. Nonlimiting examples of suitable aromatic esters include $C_{1-10}$ alkyl or cycloalkyl esters of aromatic monocarboxylic acids. Suitable substituted derivatives thereof include compounds substituted both on the aromatic ring(s) or the ester group with one or more substituents containing one or more Group 14, 15 or 16 heteroatoms, especially oxygen. Examples of such substituents include (poly)alkylether, cycloalkylether, arylether, aralkylether, alkylthioether, arylthioether, dialkylamine, diarylamine, diaralkylamine, and trialkylsilane groups. The aromatic carboxylic acid ester may be a $C_{1-20}$ hydrocarbyl ester of benzoic acid wherein the hydrocarbyl group is unsubstituted or substituted with one or more Group 14, 15 or 16 heteroatom containing substituents and $C_{1-20}$ (poly)hydrocarbyl ether derivatives thereof, or $C_{1-4}$ alkyl benzoates and $C_{1-4}$ ring alkylated derivatives thereof, or methyl benzoate, ethyl benzoate, propyl benzoate, methyl p-methoxybenzoate, methyl p-ethoxybenzoate, ethyl p-methoxybenzoate, and ethyl p-ethoxybenzoate. In an embodiment, the aromatic carboxylic acid ester is ethyl p-ethoxybenzoate.

In an embodiment, the ALA is an aliphatic ester. The aliphatic ester may be a $C_{4-30}$ aliphatic acid ester, may be a mono- or a poly-(two or more) ester, may be straight chain or branched, may be saturated or unsaturated, and any combination thereof. The $C_{4-30}$ aliphatic acid ester may also be substituted with one or more Group 14, 15 or 16 heteroatom containing substituents. Nonlimiting examples of suitable $C_{4-30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ alkyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In a further embodiment, the $C_{4-30}$ aliphatic acid ester may be isopropyl myristate and/or di-n-butyl sebacate.

In an embodiment, the ALA is isopropyl myristate.

In an embodiment, the ALA is a diether. The diether may be a dialkyl diether represented by the following formula,

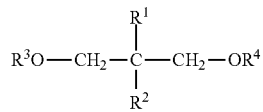

wherein $R_1$ to $R_4$ are independently of one another an alkyl, aryl or aralkyl group having up to 20 carbon atoms, which may optionally contain a group 14, 15, 16, or 17 heteroatom, provided that $R_1$ and $R_2$ may be a hydrogen atom. Nonlimiting examples of suitable dialkyl ether compounds include dimethyl ether, diethyl ether, dibutyl ether, methyl ethyl ether, methyl butyl ether, methyl cyclohexyl ether, 2,2-dimethyl-1,3-dimethoxypropane, 2,2-diethyl-1,3-dimethoxypropane, 2,2-di-n-butyl-1,3-dimethoxypropane, 2,2-diisobutyl-1,3-dimethoxypropane, 2-ethyl-2-n-butyl-1,3-dimethoxypropane, 2-n-propyl-2-cyclopentyl-1,3-dimethoxypropane, 2,2-dimethyl-1,3-diethoxypropane, 2-isopropyl-2-isobutyl-1,3-dimethoxypropane, 2,2-dicyclopentyl-1,3-dimethoxypropane, 2-n-propyl-2-cyclohexyl-1,3-diethoxypropane, and 9,9-bis(methoxymethyl)fluorene. In a further embodiment, the dialkyl ether compound is 2,2-diisobutyl-1,3-dimethoxypropane.

In an embodiment, the ALA is a poly(alkylene glycol) ester. Nonlimiting examples of suitable poly(alkylene glycol) esters include poly(alkylene glycol) mono- or diacetates, poly(alkylene glycol) mono- or di-myristates, poly(alkylene glycol) mono- or di-laurates, poly(alkylene glycol) mono- or di-oleates, glyceryl tri(acetate), glyceryl tri-ester of $C_{2-40}$ aliphatic carboxylic acids, and any combination thereof. In an embodiment, the poly(alkylene glycol) moiety of the poly(alkylene glycol) ester is a poly(ethylene glycol).

In an embodiment, the molar ratio of aluminum to ALA may be 1.4-85:1, or 2.0-50:1, or 4-30:1. For ALA that contains more than one carboxylate group, all the carboxylate groups are considered effective components. For example, a sebacate molecule contains two carboxylate functional groups is considered to have two effective functional molecules.

In an embodiment, the M-EED comprises isopropyl myristate as the ALA, dicyclopentyldimethoxysilane as SCA1, and SCA2 is selected from methylcyclohexyldiethoxysilane, diisobutyldiethoxysilane, di-n-butyl-dimethoxysilane, n-propyltriethoxysilane, benzyltriethoxysilane, but-3-enyltriethoxysilane, 1-(triethoxysilyl)-2-pentene, (triethoxysilyl)cyclohexane, tetraethoxysilane, 1-ethoxy-2-(6-(2-ethoxyphenoxy)hexyloxy)benzene, 1-ethoxy-2-n-pentoxybenzene, and any combination thereof.

In an embodiment, the M-EED includes dicyclopentyldimethoxysilane as SCA1, tetraethoxysilane as SCA2, and isopropyl myristate as the ALA.

In an embodiment, the M-EED includes dicyclopentyldimethoxysilane as SCA1, n-propyltriethoxysilane as SCA2, and isopropyl myristate as the ALA.

The present catalyst composition may comprise two or more embodiments disclosed herein.

In an embodiment, a polymerization process is provided. The polymerization process includes contacting propylene and optionally at least one other olefin with a catalyst composition in a polymerization reactor under polymerization conditions. The catalyst composition may be any catalyst composition disclosed herein and includes a procatalyst composition with the alkoxyalkyl 2-propenoate (compounded or not compounded), a cocatalyst, an external electron donor, or a mixed external electron donor (M-EED). The procatalyst composition with the compounded alkoxyalkyl 2-propenoate includes greater than 4.5 wt % of an alkoxyalkyl 2-propenoate. The process also includes forming a propylene-based polymer. The propylene-based polymer contains an alkoxyalkyl 2-propenoate.

In an embodiment, the catalyst composition includes a mixed external electron donor (M-EED) composed of an activity limiting agent (ALA), a first selectivity control agent (SCA1), and a second selectivity control agent (SCA2). The process includes forming a propylene-based polymer containing an alkoxyalkyl 2-propenoate and having a melt flow rate greater than 10 g/10 min, or greater than 25 g/10 min, or greater than 50 g/10 min, or greater than 75 g/10 min, or greater than 100 g/10 min to 2000 g/10 min, or 1000 g/10 min, or 500 g/10 min, or 400 g/10 min, or 200 g/10 min.

In an embodiment, the present catalyst composition includes a SCA/ALA mixture of: (i) a selectivity control agent selected from structure (III), SCA1, or SCA2 as disclosed above, and (ii) an activity limiting agent (ALA). Nonlimiting examples of suitable SCA/ALA mixtures include dicyclopentyldimethoxysilane and isopropyl myristate; dicyclopentyldimethoxysilane and poly(ethylene glycol) laurate; diisopropyldimethoxysilane and isopropyl myristate; methylcyclohexyldimethoxysilane and isopropyl myristate; methylcyclohexyldimethoxysilane and ethyl 4-ethoxybenzoate; n-propyltrimethoxysilane and isopropyl myristate; and combinations thereof.

The process includes contacting propylene and optionally at least one other olefin with the catalyst composition in a polymerization reactor. One or more olefin monomers can be introduced into the polymerization reactor along with the propylene to react with the catalyst and to form a polymer, a copolymer, (or a fluidized bed of polymer particles). Nonlimiting examples of suitable olefin monomers include ethylene, $C_{4-20}$ α-olefins, such as 1-butene, 1-pentene, 1-hexene, 4-methyl-1-pentene, 1-heptene, 1-octene, 1-decene, 1-dodecene and the like; $C_{4-20}$ diolefins, such as 1,3-butadiene, 1,3-pentadiene, norbornadiene, 5-ethylidene-2-norbornene (ENB) and dicyclopentadiene; $C_{8-40}$ vinyl aromatic compounds including styrene, o-, m-, and p-methylstyrene, divinylbenzene, vinylbiphenyl, vinylnapthalene; and halogen-substituted $C_{8-40}$ vinyl aromatic compounds such as chlorostyrene and fluorostyrene.

In an embodiment, the process includes contacting propylene with the catalyst composition to form a propylene homopolymer.

In an embodiment, the process includes introducing an active propylene-based polymer from a first polymerization reactor into a second polymerization reactor. The first polymerization reactor and the second polymerization reactor operate in series, whereby the effluent from the first polymerization reactor is charged to the second polymerization reactor and one or more additional (or different) olefin monomer(s) is/are added to the second polymerization reactor to continue polymerization to form a propylene copolymer or a propylene impact copolymer. In a further embodiment, each of the first polymerization reactor and the second polymerization reactor is a gas phase polymerization reactor.

As used herein, "polymerization conditions" are temperature and pressure parameters within a polymerization reactor suitable for promoting polymerization between the catalyst composition and an olefin to form the desired polymer. The polymerization process may be a gas phase, a slurry, or a bulk polymerization process, operating in one, or more than one, polymerization reactor. Accordingly, the polymerization reactor may be a gas phase polymerization reactor, a liquid-phase polymerization reactor, or a combination thereof.

It is understood that provision of hydrogen in the polymerization reactor is a component of the polymerization conditions. During polymerization, hydrogen is a chain transfer agent and affects the molecular weight (and correspondingly the melt flow rate) of the resultant polymer.

In an embodiment, polymerization occurs by way of liquid phase polymerization.

In an embodiment, polymerization occurs by way of gas phase polymerization. As used herein, "gas phase polymerization" is the passage of an ascending fluidizing medium, the fluidizing medium containing one or more monomers, in the presence of a catalyst through a fluidized bed of polymer particles maintained in a fluidized state by the fluidizing medium. "Fluidization," "fluidized," or "fluidizing" is a gas-solid contacting process in which a bed of finely divided polymer particles is lifted and agitated by a rising stream of gas. Fluidization occurs in a bed of particulates when an upward flow of fluid through the interstices of the bed of particles attains a pressure differential and frictional resistance increment exceeding particulate weight. Thus, a "fluidized bed" is a plurality of polymer particles suspended in a fluidized state by a stream of a fluidizing medium. A "fluidizing medium" is one or more olefin gases, optionally a carrier gas (such as $H_2$ or $N_2$) and optionally a liquid (such as a hydrocarbon) which ascends through the gas-phase reactor.

A typical gas-phase polymerization reactor (or gas phase reactor) includes a vessel (i.e., the reactor), the fluidized bed, a distribution plate, inlet and outlet piping, a compressor, a cycle gas cooler or heat exchanger, and a product discharge system. The vessel includes a reaction zone and a velocity reduction zone, each of which is located above the distribution plate. The bed is located in the reaction zone. In an embodiment, the fluidizing medium includes propylene gas and at least one other gas such as an olefin and/or a carrier gas such as hydrogen or nitrogen.

In an embodiment, the contacting occurs by way of feeding the catalyst composition into the polymerization reactor and introducing the olefin into the polymerization reactor. In an embodiment, the process includes contacting the olefin with a cocatalyst. The cocatalyst can be mixed with the procatalyst composition (pre-mix) prior to the introduction of the procatalyst composition into the polymerization reactor. In another embodiment, cocatalyst is added to the polymerization reactor independently of the procatalyst composition. The independent introduction of the cocatalyst into the polymerization reactor can occur simultaneously, or substantially simultaneously, with the procatalyst composition feed.

The present disclosure provides a polymeric composition. The polymeric composition may be made by any of the foregoing polymerization processes. In an embodiment, a polymeric composition is provided and includes a polypropylene homopolymer containing an alkoxyalkyl 2-propenoate. The polypropylene homopolymer contains less than 8.0% XS and has a $T_{MF}$ greater than 168° C. In an embodiment, the polypropylene homopolymer contains less than 4.0%, or less than 3.5%, or less than 2.5% XS. In another embodiment, the polypropylene homopolymer has a $T_{MF}$ greater than 170° C., or greater than 171° C., or greater than 172° C. to 175° C., 174° C. or 173° C.

The present polymerization process may comprise two or more embodiments disclosed herein.

DEFINITIONS

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, reference melt index, melt flow rate, and other properties.

The term "alkyl," as used herein, refers to a branched or unbranched, saturated or unsaturated acyclic hydrocarbon radical. Nonlimiting examples of suitable alkyl radicals include, for example, methyl, ethyl, n-propyl, i-propyl, n-butyl, t-butyl, i-butyl (or 2-methylpropyl), etc. The alkyls have 1 and 20 carbon atoms.

The term "aryl," as used herein, refers to an aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl, among others. The aryls have 1 and 20 carbon atoms.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term, "ethylene-based polymer," as used herein, refers to a polymer that comprises a majority weight percent polymerized ethylene monomer (based on the total weight of polymerizable monomers), and optionally may comprise at least one polymerized comonomer.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term "olefin-based polymer" is a polymer containing, in polymerized form, a majority weight percent of an olefin, for example ethylene or propylene, based on the total weight of the polymer. Nonlimiting examples of olefin-based polymers include ethylene-based polymers and propylene-based polymers.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

A "primary alkyl group" has the structure —$CH_2R_1$ wherein $R_1$ is hydrogen or a substituted/unsubstituted hydrocarbyl group.

The term, "propylene-based polymer," as used herein, refers to a polymer that comprises a majority weight percent polymerized propylene monomer (based on the total amount of polymerizable monomers), and optionally may comprise at least one polymerized comonomer.

A "secondary alkyl group" has the structure —$CHR_1R_2$ wherein each of $R_1$ and $R_2$ is a substituted/unsubstituted hydrocarbyl group.

The term "substituted alkyl," as used herein, refers to an alkyl as just described in which one or more hydrogen atom bound to any carbon of the alkyl is replaced by another group such as a halogen, aryl, substituted aryl, cycloalkyl, substituted cycloalkyl, heterocycloalkyl, substituted heterocycloalkyl, halogen, haloalkyl, hydroxy, amino, phosphido, alkoxy, amino, thio, nitro, and combinations thereof. Suitable substituted alkyls include, for example, benzyl, trifluoromethyl and the like.

A "tertiary alkyl group" has the structure —$CR_1R_2R_3$ wherein each of $R_1$, $R_2$, and $R_3$ is a substituted/unsubstituted hydrocarbyl group.

Test Methods

Final melting point $T_{MF}$ is the temperature to melt the most perfect crystal in the sample and is regarded as a measure for isotacticity and inherent polymer crystallizability. The test was conducted using a TA Q100 Differential Scanning calorimeter. A sample is heated from 0° C. to 240° C. at a rate of 80° C./min, cooled at the same rate to 0° C., then heated again at the same rate up to 150° C., held at 150° C. for 5 minutes and the heated from 150° C. to 180° C. at 1.25° C./min. The $T_{MF}$ is determined from this last cycle by calculating the onset of the baseline at the end of the heating curve.

Testing procedure:
(1) Calibrate instrument with high purity indium as standard.
(2) Purge the instrument head/cell with a constant 50 ml/min flow rate of nitrogen constantly.
(3) Sample preparation:

Compression mold 1.5 g of powder sample using a 30-G302H-18-CX Wabash Compression Molder (30 ton): (a) heat mixture at 230° C. for 2 minutes at contact; (b) compress the sample at the same temperature with 20 ton pressure for 1 minute; (c) cool the sample to 45° F. and hold for 2 minutes with 20 ton pressure; (d) cut the plaque into 4 of about the same size, stack them together, and repeat steps (a)-(c) in order to homogenize sample.

(4) Weigh a piece of sample (preferably between 5 to 8 mg) from the sample plaque and seal it in a standard aluminum sample pan. Place the sealed pan containing the sample on the sample side of the instrument head/cell and place an empty sealed pan in the reference side. If using the auto sampler, weigh out several different sample specimens and set up the machine for a sequence.
(5) Measurements:
   (i) Data storage: off
   (ii) Ramp 80.00° C./min to 240.00° C.
   (iii) Isothermal for 1.00 min
   (iv) Ramp 80.00° C./min to 0.00° C.
   (v) Isothermal for 1.00 min
   (vi) Ramp 80.00° C./min to 150.00° C.
   (vii) Isothermal for 5.00 min
   (viii) Data storage: on
   (ix) Ramp 1.25° C./min to 180.00° C.
   (x) End of method
(6) Calculation: $T_{MF}$ is determined by the interception of two lines. Draw one line from the base-line of high temperature. Draw another line from through the deflection of the curve close to the end of the curve at high temperature side.

Melt flow rate (MFR) is measured in accordance with ASTM D 1238-01 test method at 230° C. with a 2.16 kg weight for propylene-based polymers.

Polydispersity Index (PDI) is measured by an AR-G2 rheometer which is a stress control dynamic spectrometer manufactured by TA Instruments using a method according to Zeichner G R, Patel P D (1981) "A comprehensive Study of Polypropylene Melt Rheology" Proc. Of the 2nd World Congress of Chemical Eng., Montreal, Canada. An ETC oven is used to control the temperature at 180° C.±0.1° C. Nitrogen is used to purge the inside the oven to keep the sample from degradation by oxygen and moisture. A pair of 25 mm in diameter cone and plate sample holder is used. Samples are compress molded into 50 mm×100 mm×2 mm plaque. Samples are then cut into 19 mm square and loaded on the center of the bottom plate. The geometries of upper cone is (1) Cone angle: 5:42:20 (deg:min:l); (2) Diameter: 25 mm; (3) Truncation gap: 149 micron. The geometry of the bottom plate is 25 mm cylinder.

Testing procedure:
(1) The cone & plate sample holder are heated in the ETC oven at 180° C. for 2 hours. Then the gap is zeroed under blanket of nitrogen gas.
(2) Cone is raised to 2.5 mm and sample loaded unto the top of the bottom plate.
(3) Start timing for 2 minutes.
(4) The upper cone is immediately lowered to slightly rest on top of the sample by observing the normal force.
(5) After two minutes the sample is squeezed down to 165 micron gap by lower the upper cone.
(6) The normal force is observed. When the normal force is down to <0.05 Newton the excess sample is removed from the edge of the cone and plate sample holder by a spatula.
(7) The upper cone is lowered again to the truncation gap which is 149 micron.
(8) An Oscillatory Frequency Sweep test is performed under these conditions:
   Test delayed at 180° C. for 5 minutes.
   Frequencies: 628.3 r/s to 0.1 r/s.
   Data acquisition rate: 5 point/decade.
   Strain: 10%
(9) When the test is completed the crossover modulus (Gc) is detected by the Rheology Advantage Data Analysis program furnished by TA Instruments.
(10) PDI=100,000÷Gc (in Pa units).

Xylene Solubles (XS) is measured using a $^1$H NMR method as described in U.S. Pat. No. 5,539,309, the entire content of which is incorporated herein by reference.

By way of example and not by limitation, examples of the present disclosure will now be provided.

EXAMPLES

1. Procatalyst Precursor

MagTi-1 is used as a procatalyst precursor. MagTi-1 is a mixed Mg/Ti precursor with composition of $Mg_3Ti(OEt)_8Cl_2$ (prepared according to example 1 in U.S. Pat. No. 6,825,146). Titanium content for each of the resultant procatalyst compositions is listed in Table 1. The peaks for internal donors are assigned according to retention time from GC analysis.

A. First Contact 3.00 g of MagTi-1 is charged into a flask equipped with mechanical stirring and with bottom filtration. 60 ml of a mixed solvent of $TiCl_4$ and chlorobenzene (1/1 by volume) is introduced into the flask followed immediately by addition of 2.52 mmol of alkoxyalkyl 2-propenoate or 2-methoxyethyl isobutyrate. The mixture is heated to 115° C. in 15 minutes and remains at 115° C. for 60 minutes with stirring at 250 rpm before filtering off the liquid.

B. Second Contact/Halogenation 60 ml of mixed solvent and optionally 2.52 mmol of alkoxyalkyl 2-propenoate or 2-methoxyethyl isobutyrate are added again and the reaction is allowed to continue at the same desired temperature for 30 minutes with stirring followed by filtration.

C. Third Contact/Halogenation

Same as second halogenation.

The final procatalyst composition is rinsed three times at room temperature with 70 ml of isooctane and dried under nitrogen flow for 2 hours.

Procatalyst properties are set forth in Table 1 below. Weight percent is based on total weight of the procatalyst composition. The data in Table 1 are based on MagTi-1 as the procatalyst precursor. Abbreviations in Table 1 indicate the following: AE—Alkoxyalkyl 2-Propenoate or 2-Methoxyethyl isobutyrate, EtO—Ethoxide, IED—Internal Electron Donor (complexed form of AE—Alkoxyalkyl 2-Propenoate or 2-Methoxyethyl isobutyrate in procatalyst).

TABLE 1

| Ref # | AE | Name | 1st AE Addition (mmol) | 2nd AE Addition (mmol) | Ti (%) | EtO (%) | IED (%) |
|---|---|---|---|---|---|---|---|
| 16* | (structure) | 2-methoxyethyl isobutyrate | 2.52 | | 3.72 | 0.71 | trace |
| 20 | (structure) | 2-methoxyethyl methacrylate | 2.52<br>2.52 | <br>2.52 | NM<br>NM | 0.39<br>0.35 | 0.72<br>5.91 |
| 21 | (structure) | 2-ethoxyethyl methacrylate | 2.52<br>2.52 | <br>2.52 | 3.97<br>2.39 | 0.50<br>0.21 | 1.72<br>4.68 |

*Comparative

2. Polymerization

Polymerization is performed in liquid propylene in a 1-gallon autoclave. After conditioning, the reactor is charged with 1375 g of propylene and a targeted amount of hydrogen and brought to 62° C. 0.25 mmol of dicyclopentyldimethoxysilane is added to a 0.27 M triethylaluminum solution in isooctane, followed by addition of 0.34 ml of a 5.0 wt % procatalyst slurry in mineral oil. The mixture is premixed at ambient temperature for 20 minutes before being injected into the reactor to initiate the polymerization. The premixed catalyst components are flushed into the reactor with isooctane using a high pressure catalyst injection pump. After the exotherm, the temperature is maintained at 67° C. Total polymerization time was 1 hour.

Polymer samples are tested for melt flow rate (MFR), xylene solubles (XS), polydispersity index (PDI), and final melting point ($T_{MF}$). XS is measured using $^1$H NMR method.

Catalyst performance and polymer properties are provided in Table 2 below.

NM=Not measured
N/A=Not available

TABLE 2

| Ref # | AE | Number Of AE Additions | Al/EED | $H_2$ (mmol) | MFR (g/10 min) | XS (%) | Activity (kg/g-hr) | PDI | $T_{MF}$ (° C.) |
|---|---|---|---|---|---|---|---|---|---|
| 16* | (structure) | 1<br>2 | 6.8<br>6.8 | 67.0<br>67.0 | 7.2<br>6.0 | 8.6<br>6.9 | 16.6<br>11.0 | <br>5.12 | |
| 20 | (structure) | 1<br>2 | 6.8<br>6.8 | 67.0<br>67.0 | 4.0<br>1.5 | 7.0<br>2.6 | 13.5<br>8.0 | 5.03<br>4.56 | <br>172.32 |

TABLE 2-continued

| Ref # | AE | Number Of AE Additions | Al/ EED | $H_2$ (mmol) | MFR (g/10 min) | XS (%) | Activity (kg/g-hr) | PDI | $T_{MF}$ (°C.) |
|---|---|---|---|---|---|---|---|---|---|
| 21 | 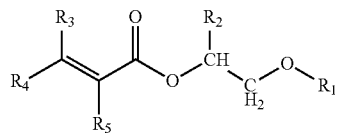 | 1 | 6.8 | 67.0 | 5.6 | 6.3 | 12.6 | 4.96 | |
| | | 2 | 6.8 | 67.0 | 1.7 | 2.3 | 12.9 | 4.53 | 172.10 |

*Comparative

Results

Comparison between AE 16 and AE 20 demonstrates that introduction of the alkenyl group to AE improves catalyst selectivity, especially for the procatalyst that is made via multiple contact steps (i.e., a compounded alkoxy alkyl 2-propenoate).

Replacing the methoxy group in AE 20 with an ethoxy group improves catalyst activity.

High $T_{MF}$ can be achieved using a procatalyst composition containing compounded 2-propenoate internal donor.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A catalyst composition comprising:
   a procatalyst composition comprising a combination of a magnesium moiety, a titanium moiety, and an internal electron donor comprising an alkoxyalkyl 2-propenoate having the structure (I)

wherein $R_1$-$R_5$ are the same or different, $R_1$ is selected from the group consisting of a $C_1$-$C_{20}$ primary alkyl group, a substituted $C_1$-$C_{20}$ primary alkyl group, and a $C_2$-$C_{20}$ alkenyl group;
   $R_2$ is selected from the group consisting of hydrogen, a $C_1$-$C_{20}$ primary alkyl group, a substituted $C_1$-$C_{20}$ primary alkyl group, and a $C_2$-$C_{20}$ alkenyl group; and
   each of $R_3$, $R_4$, $R_5$ is selected from the group consisting of hydrogen, halogen, an acyclic $C_1$-$C_{20}$ hydrocarbyl group, and an acyclic substituted $C_1$-$C_{20}$ hydrocarbyl group;
   a cocatalyst; and
   an external electron donor.

2. The catalyst composition of claim 1 wherein the alkoxyalkyl 2-propenoate is 2-methoxyethyl methacrylate.

3. The catalyst composition of claim 1 wherein the alkoxyalkyl 2-propenoate is 2-ethoxyethyl methacrylate.

4. The catalyst composition of claim 1 wherein $R_1$ and $R_2$ are selected from the structure (II)

$$C(H)=C(R_{11})(R_{12}) \quad (II)$$

wherein $R_{11}$ and $R_{12}$ are the same or different, each of $R_{11}$ and $R_{12}$ is selected from the group consisting of hydrogen and a $C_1$-$C_{18}$ hydrocarbyl group.

5. The catalyst composition of claim 1 wherein the internal electron donor is a compounded internal electron donor comprising greater than 4.5 wt % alkoxyalkyl 2-propenoate.

6. The catalyst composition of claim 1 comprising a mixed external electron donor (M-EED) comprising an activity limiting agent (ALA) and a selectivity control agent (SCA).

7. The catalyst composition of claim 6 wherein the SCA comprises an alkoxysilane.

8. The catalyst composition of claim 6 wherein the SCA comprises a dimethoxysilane.

* * * * *